United States Patent

Nguyen

[11] Patent Number: 5,960,671
[45] Date of Patent: Oct. 5, 1999

[54] ECCENTRIC PIVOTABLE MOUNTING FOR CHANGING GEAR REDUCTION RATIOS

[75] Inventor: Chuong H. Nguyen, Lansdale, Pa.

[73] Assignee: Philadelphia Gear Corp., Palmyra, Pa.

[21] Appl. No.: 08/940,060

[22] Filed: Sep. 30, 1997

[51] Int. Cl.$^6$ .............................. F16H 35/06; F16H 57/02
[52] U.S. Cl. .......................... 74/397; 74/325; 74/421 A; 74/606 R
[58] Field of Search ........................ 74/325, 397, 421 A, 74/606 R

[56] References Cited

U.S. PATENT DOCUMENTS

| | | | |
|---|---|---|---|
| 1,790,243 | 1/1931 | Nilson | 74/397 |
| 1,799,100 | 3/1931 | Keil | 74/397 |
| 1,887,832 | 11/1932 | Brown | 74/397 |
| 2,507,555 | 5/1950 | Berthiez | 74/397 |
| 3,286,994 | 11/1966 | Manna | 74/397 X |
| 3,752,001 | 8/1973 | Inaba et al. | 74/409 |
| 3,989,176 | 11/1976 | Hope et al. | 226/189 |
| 4,027,541 | 6/1977 | Nishiokia | 74/10.54 |
| 4,088,306 | 5/1978 | Falner | 254/187.8 |
| 4,191,060 | 3/1980 | Sessa | 74/89.22 |
| 4,310,768 | 1/1982 | Colley | 290/1 |
| 4,318,623 | 3/1982 | Curtis | 366/431 |
| 4,347,009 | 8/1982 | Brown | 400/611 |
| 4,382,683 | 5/1983 | Teagle | 366/44 |
| 4,437,213 | 3/1984 | Reese et al. | 29/33 |
| 4,455,891 | 6/1984 | Freeman | 74/793 |
| 4,721,003 | 1/1988 | Hutchings et al. | 74/421 |
| 4,983,151 | 1/1991 | Pires | 475/170 |
| 5,094,542 | 3/1992 | Engels et al. | 366/282 |
| 5,149,194 | 9/1992 | Engels et al. | 366/282 |
| 5,150,630 | 9/1992 | Kida et al. | 74/354 |
| 5,290,208 | 3/1994 | Minegishi | 475/178 |
| 5,352,163 | 10/1994 | Minegishi et al. | 475/178 |
| 5,560,709 | 10/1996 | Hutchings et al. | 366/331 |

*Primary Examiner*—Allan D. Herrmann
*Attorney, Agent, or Firm*—Duane, Morris & Heckscher LLP

[57] ABSTRACT

A gear reducer, especially for a mixer, has a housing supporting a pinion shaft with a pinion gear rotatably driven by a motor, mechanically coupled with a rotatable driven shaft having a driven gear meshing with the pinion gear. The driven gear can be coupled, for example, to the impeller of a mixer via a vertical impeller shaft. The pinion shaft is carried in a cartridge that is adjustably mounted to the housing for moving the pinion shaft toward and away from the driven gear and for accommodating pinion gears of different diameters to change the gear reduction ratio without the need to change the driven gear on the impeller shaft. The cartridge is pivotally mounted to the housing at a point spaced from the axis of the driven shaft such that the cartridge and the pinion gear can be rotated toward and away from the driven gear. This also permits intermediate reduction gears that may extend below the driven gear to be moved clear of the driven gear such that the cartridge can be lifted free. The pivotal mounting is located in a top part of the housing, and is fixable at least at one angular position by an indexing pin extending through parts of the cartridge and the housing. A series of indexing pin holes can be provided for selecting the angular position to accommodate a particular diameter pinion gear. The bottom part of the housing defines a common lubricant receptacle immersing the pinion, the driven gear and supporting bearings.

15 Claims, 3 Drawing Sheets

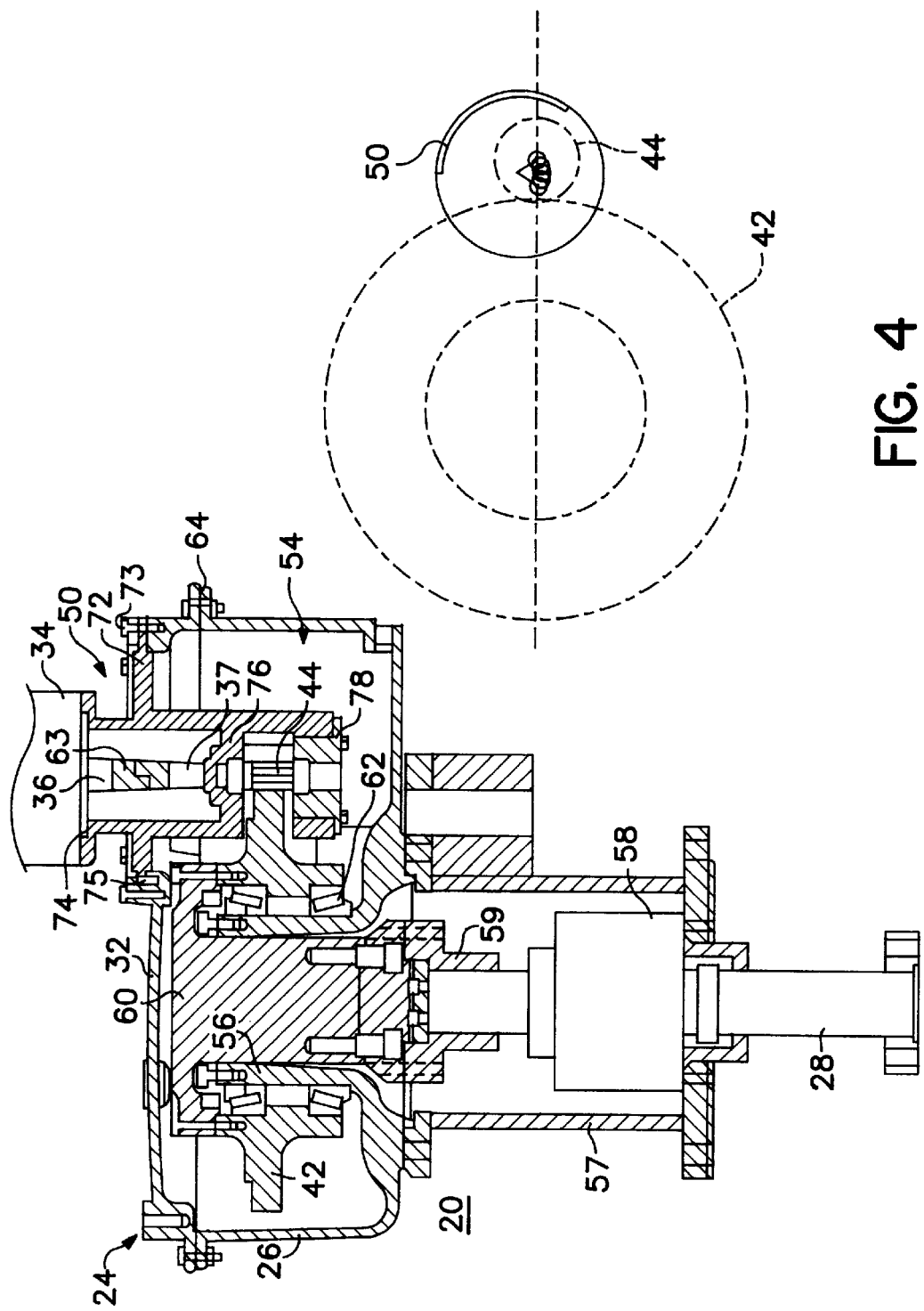

ECCENTRIC PIVOTABLE MOUNTING FOR CHANGING GEAR REDUCTION RATIOS

BACKGROUND OF THE INVENTION

1. Field of the Invention

The invention relates to gear reduction units and is particularly applicable to mixing apparatus and methods. A motor driven gear reduction unit has at least two parallel shafts coupled respectively to a driving pinion gear and a driven gear meshing with the pinion gear. A first such shaft and its gear (the input pinion) are carried on a self contained mounting or cartridge that pivots the first shaft around a pivot axis parallel to and spaced from the axis of the other shaft. Pivoting the mounting changes the distance between the rotational axes of the two shafts and allows either or both of the driving and driven gears to be replaced with gear(s) of a different diameter.

In a mixer drive embodiment, different diameter pinions can be selected and installed to mesh with a given diameter low speed driven gear for choosing the reduction ratio of the drive. Pivoting the cartridge eccentrically carrying one or more pinions moves the meshing pinion clear of the low speed gear such that the cartridge can be lifted out of the drive. In a multiple reduction arrangement, pivoting also can move an intermediate reduction pinion clear of the low speed gear, enabling the cartridge to be lifted clear. Among other benefits, the drive conveniently allows different diameter gears to be installed on the respective shafts for changing gear reduction ratios and/or substitution of cartridges with single and plural reduction stages, without substantially reconfiguring the mixing apparatus to do so.

2. Prior Art

There are various situations in which it may be desirable to configure a geared drive to have a particular reduction ratio. A basic gear reducer comprises two parallel spaced shafts that are rotationally mounted in suitable bores, bearings or similar fittings in a housing. Fixed to the shafts are meshing gears of which one is a driving gear and one is a driven gear. If a particular reduction ratio (or perhaps increasing ratio) is needed to obtain predetermined torque and speed characteristics, the diameters of the gears are selected accordingly. Whereas the gears must mesh and the spacing of the parallel shafts typically is fixed by the fittings in the housing, enlarging the diameter of one gear is accompanied by decreasing the diameter of the other gear, and vice versa.

A mixer for industrial and commercial applications involving the mixing and agitation of liquids, liquid suspensions and other materials, typically comprises an impeller on a vertical shaft extending into a container for mixing the contents of the container by rotation of the impeller. A motor is coupled to the shaft, generally through reduction gears that reduce rotational speed and increase mechanical advantage between the motor and the impeller for developing sufficient torque. This can involve single pairs of gears or multiple pairs. Relatively smaller diameter gears are provided on the motor side of the gear train and relatively larger diameter gears on the impeller shaft side.

An example of a drive apparatus for such a mixer having a housing forming a lubricant well is disclosed in U.S. Pat. No. 4,721,003—Hutchings et al., the disclosure of which is hereby incorporated. The drive apparatus has a housing with a base having an upwardly and inwardly extending tubular part and surrounding sidewalls, forming a lubricant receptacle between the tubular part and the sidewalls. A vertical impeller shaft extends upwardly into the housing. A rotatable hub surrounding the tubular part is affixed to the impeller shaft and carries a large low speed gear at an elevation below the upper edges of the sidewalls and the tubular part, namely in the lubricant receptacle. A drive shaft, for example coupled to an electric motor, is spaced from and parallel to the impeller shaft. A relatively smaller high speed pinion gear on the drive shaft meshes with the larger low speed gear on the hub. The hub bridges over the tubular part and the hole therein, coupling with the impeller shaft via a split ring clamping structure. The impeller shaft extends through the hole and is located by its coupling with the hub to leave an annular gap between the impeller shaft and the tubular part. The gap defines a radial running clearance for the impeller shaft and receives a seal assembly.

The body of the motor protrudes upwardly from a mounting on a cover of the housing, and is flexibly coupled to the drive shaft carrying the pinion. The drive shaft forms an extension of the shaft of the motor. The drive shaft is journalled by bearings disposed in inwardly extending flanges of the base of the housing. This structure fixes the positions of the driving and driven shafts, and more particularly makes the spacing of the axes of the shafts invariable. It is possible to employ additional reduction gearing with one or more intermediate shafts journalled in the housing and being mechanically coupled between the motor and the driven shaft. Such an intermediate shaft can be provided with a larger gear coupled to a motor shaft pinion and a smaller pinion coupled to the low speed gear. In that case, the relative positions of each of the motor shaft, the intermediate shaft and the driven impeller shaft are fixed with respect to the housing by bushings or bearings rigidly mounted in the walls or flanges of the housing.

Mixers may be applied to mix or agitate compositions over a wide range of viscosities, densities and attributes, and may need to do more or less shaft work on the compositions depending on the particular process involved. Different processes and different compositions call for different impeller rotation speeds and different torque requirements. In a stable process, a mixer can be configured to provide the optimal speed and torque, but for process variations and job changes, different requirements may necessitate variable speed drives and different gear ratios.

In a mixer such as that of U.S. Pat. No. 4,721,003—Hutchings et al., or a similar device in which the drive shaft pinion and/or motor are eccentric to the impeller shaft, it is necessary to remove and replace both gears in each intermeshing pair to change the gear reduction ratio. This is because the axes of the drive shaft and the impeller shaft are fixed. To reduce the reduction ratio, for example, the larger or low-speed gear is replaced with a gear having a smaller outside diameter, and the smaller or high-speed gear is replaced with a gear having a correspondingly larger outside diameter so that the two new gears mesh. In a device such as the Hutchings mixer, this involves replacing both the drive shaft pinion and the low speed gear, and substantially disassembling and reassembling the drive mechanism. In a mixer having an additional reduction gear pair, four gears might have to be replaced, etc. Even if the object is to supply a range of mixers with different speed/torque characteristics (rather than to reconfigure a mixer), it would be advantageous if the gear reduction ratio could be changed more conveniently and without requiring an undue inventory of parts.

A modular mixer drive system is disclosed in U.S. Pat. No. 5,149,194—Engels et al. The motor, transmission, bearing housing and impeller shaft components are all modularly replaceable to reconfigure a mixing apparatus for particular mixing applications. The components may be assembled to provide direct drive from the motor to the impeller shaft (without reduction gears), or through a gear transmission having a chosen reduction ratio. The Engels arrangement uses a coaxial motor and impeller shaft coupled (if desired) by one or more planetary gear trains wherein the diameters of the gears determine the reduction ratio. Engels thereby allows the reduction ratio to be changed by swapping gear reduction modules. Only the bearing housing is common to all of the variations, which can receive any of a plurality of gear sets. Nevertheless, substantial disassembly and reassembly steps are required to make a gear reduction change, and an inventory of complementary large and small planetary gears is needed to meet a range of speed/torque requirements.

According to an aspect of the present invention, the reduction ratio of a mixer drive unit can be altered by changing the diameter of one of a pair of meshing gears, mounted in an eccentric cartridge to provide variable shaft center distances. The cartridge can be rotated for adjusting the distance between the axes of the shafts carrying the gears. According to a further aspect, the motor shaft carrying a pinion gear is eccentrically mounted in a unitary cartridge that is rotatable in the housing carrying the impeller shaft. The pivotal coupling of the cartridge to the housing is on an axis spaced from and parallel to both the driving pinion shaft and the driven shaft (e.g., the impeller shaft or relatively slower speed gear). By rotating the cartridge, the eccentric pinion rotation axis is moved toward or away from the driven gear. This has been found to provide a quick and convenient way to configure or change reduction ratios that does not involve substantial disassembly of the mixer drive unit in order to configure the mixer for different requirements of speed and/or torque, and does not require changing the diameters of both meshing gears.

According to a further inventive aspect, the pivotal cartridge, which can be provided with pinion gears of different diameters, is disposed within the side walls of the mixer housing in the lubricant reservoir. However, without disassembling the entire housing, the cartridge can be pivoted outwardly to disengage the pinion from the driven shaft gear. The unitary cartridge then can be lifted free. Likewise, the cartridge can be provided with a different diameter pinion, inserted into the housing and pivoted to engage the pinion with the driven shaft gear.

In a multiple stage gear reduction arrangement, the motor shaft pinion can drive the larger gear on an intermediate shaft having a smaller pinion driving the large low speed gear. In such an arrangement, the larger gear on the intermediate shaft extends below the large low speed gear that meshes with the smaller pinion. The pivotable cartridge of the invention readily pivots outwardly to clear the larger gear on the intermediate shaft from the large low speed gear, making the invention particularly apt for multiple reduction gears.

SUMMARY OF THE INVENTION

It is an object of the invention to configure a low speed gear and an eccentric pinion in a gear reduction drive unit so as to be fixable at different distances from one another, enabling a given diameter low speed gear to function for a range of different diameter pinions.

It is an object of the invention to permit a reduction ratio to be configured or changed by the choice of only one of the gears in a meshed pair.

It is a further object to provide an eccentric cartridge for accommodating single and multiple reduction gears in a mixer drive, in which a pinion gear for driving a low speed gear, can be positioned nearer or farther from the axis of the low speed gear by altering the mounting of the cartridge.

It is a further object to place one or more pinion gears for single or multiple reduction gears in a unitary cartridge that wholly supports the pinion gear(s) and shaft(s) independent of an external housing such that the cartridge is removable as a unit.

It is another object to place the axis of such a pinion gear at a space from a pivot axis of a mounting of the cartridge to the mixer housing, such that the pinion gear is movable by simply rotating the cartridge.

It is still another object to apply a gear reduction device as described specifically to a mixer drive comprising a larger low speed gear and an eccentric pinion carried by a cartridge, with the gears immersed in a lubricant well formed by a lower part of an external housing, the cartridge being rotatably mounted at a predetermined rotational position in a top of the cartridge for fixing the distance between the axes of the pinion and the low speed gear.

These and other objects are accomplished by a gear reduction drive, especially for a mixing apparatus, having a housing supporting a pinion shaft with a pinion gear rotatably driven by a motor, mechanically coupled with a rotatable shaft having a driven gear meshing with the pinion gear. In a mixer apparatus the driven shaft is preferably the impeller shaft. The pinion shaft is carried in a unitary cartridge that supports the pinion shaft on opposite sides of the pinion gear. The cartridge is adjustably mounted to the mixer housing for moving the pinion shaft toward and away from the driven gear and for accommodating pinion gears of different diameters. Thus different gear reduction ratios are possible without the need to change the low speed driven gear. The cartridge is pivotally mounted to the housing at a point spaced from the axis of the impeller shaft such that the cartridge and the pinion gear can be rotated toward and away from the driven gear. The pivotal mounting is located in a top part of the housing, which exclusively supports the cartridge and the pinion shaft(s).

The mounting is applicable to single and multiple reduction gears. The cartridge mounting allows all gearing with the exception of the driven low-speed gear to be replaced as a unit. All of the gears are immersed in a reservoir for oil or other lubricant. In a single reduction arrangement for a mixer, the invention permits selection of a gear reduction ratio from about 5:1 to 20:1, providing a wide range of speed and torque selections. The pivotal cartridge preferably can be fixed at any of a number of discrete pivotal steps for specific gears, such as seven steps in a single reduction arrangement. In a double reduction embodiment several discrete pivotal steps likewise can be provided for selecting the proper shaft spacings by pivoting of the cartridge carrying the pinions.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the appended claims. In the drawings.

FIG. 3 is a section view illustrating a single reduction embodiment.

FIG. 4 is a schematic plan view showing a range of reduction ratios according to the embodiment of FIG. 3.

DETAILED DESCRIPTION OF THE PREFERRED EMBODIMENTS

Figure 1:
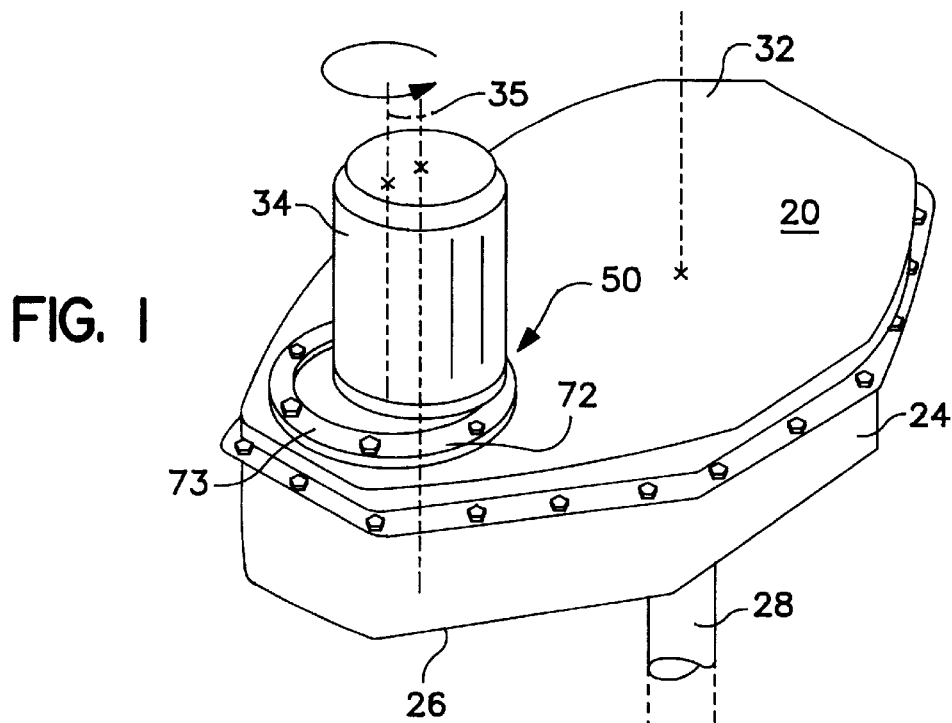
FIG. 1 is a perspective view showing a mixing apparatus according to the invention.
Figure 2:
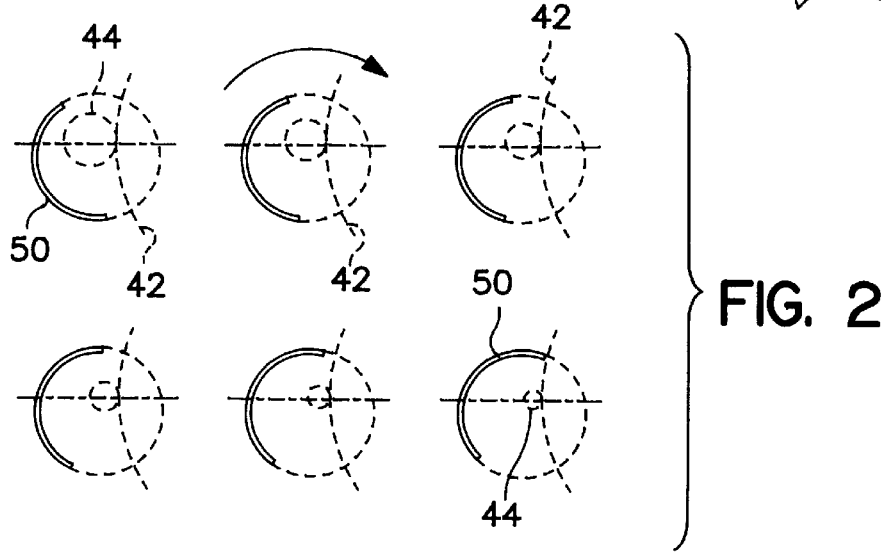
FIG. 2 is a series of graphic illustrations showing rotation of the eccentric cartridge to obtain different reduction ratios in a single reduction embodiment.

Referring to FIGS. 1, 2 and 3, a drive apparatus 20 according to the invention generally includes a housing 24 with a lower part 26 in which a driven shaft 28 is mounted, and a top cover 32 carrying a motor 34 having a shaft 36 that is flexibly coupled to the input shaft 37 of the gear reducer, parallel to and spaced from driven shaft 28. According to an inventive aspect, the drive apparatus 20 can be applied to a mixer. Referring to FIG. 3, impeller shaft 28 is attached to a large low speed gear 42 driven by an input pinion gear 44 on the input shaft 37 as explained below.

According to another inventive aspect, motor 34 and input pinion gear 44 are mounted to housing 24 such that the distance between the axis of pinion 44 (in this case the motor shaft axis) and the axis of impeller shaft 28 is variably adjustable. In this manner, pinion gears of different diameters can be selected and caused to mesh with the low speed gear 42 for changing the reduction ratio of the drive without the need to change low speed gear 42. In the embodiment shown in FIG. 1, motor 34 is carried on a unitary cartridge 50 that is rotatable in the cover 32 of housing 24. The pinion gear 44 is eccentrically placed in cartridge 50 relative to the pivot axis defined by the mounting of cartridge 50 in cover 32. Therefore, as shown by FIGS. 1 and 3, when the cartridge is pivoted in its mounting around its mounting axis 35, the motor axis and the pinion advance toward or are retracted from the axis of impeller shaft 28. FIG. 2 shows this effect for different diameter pinion gears 44 in single reduction arrangements wherein the larger driven gear 42 is of the same diameter in each example. The pinion gear 44 can be coaxial with the motor 34, but is eccentric on the mounting of cartridge 50. Different diameter pinion gears can be selected to mesh with the driven low speed gear 42 as a means to select a particular gear reduction ratio. In this manner the drive is originally configured for a particular reduction ratio or thereafter changed to a different reduction ratio.

FIG. 3 illustrates the internal driving arrangements in a single reduction embodiment. The lower part 26 of housing 24 integrally forms a bearing support and drywell oil reservoir 54 having a central tubular part 56 protruding inwardly, surrounded by vertical sidewalls forming a reservoir or well that is cast and has no seals. The housing is carried on a pedestal 57 having a base for bolting to a fixed location such as the top wall of a tank. The impeller shaft 28 is rigidly coupled by coupling 59 to the low speed shaft 60. Shaft seal 58 seals the shaft 28 to the pedestal 57. This assembly rotates inside tubular part 56 and extends over the tubular part into housing 24, carried on the outside of tubular part 56 via radial and thrust bearings 62. The input shaft 37 has a pinion gear 44 rotatably driven by motor 34 via a flexible shaft coupling 63 and meshing with the driven low speed gear 42 connected by low speed shaft 60 and coupling 59 to impeller shaft 28. The pinion gear 44, driven low speed gear 42 and bearings 62 are all located below the top edges 64 of the lower part 26 of housing 24 and normally are immersed in lubricating oil.

Cartridge 50 is mounted in the upper part 32 of housing 24 and supports the motor 34 and the input pinion shaft 37, parallel to and eccentrically spaced from the mounting axis of cartridge 50. Motor 34 can have the pinion directly attached to its shaft, or the motor shaft can be coupled to the pinion shaft by flexible coupling 63. Cartridge 50 is adjustably mounted to the top part 32 of housing 24 for moving input pinion shaft 37 toward and away from driven gear 42.

The cartridge 50 is generally cylindrical, and extends vertically past the low speed gear to provide support for the pinion shaft on opposite sides of the low speed gear. Cartridge 50 is attached to the top 32 of housing 24 by a circular flange 72 that is clamped into a complementary circular depression on housing top 32 by clamping ring 73. As shown in FIGS. 3 and 4, the motor and pinion axis are positioned eccentrically to the circular flange 72 of cartridge 50. By rotating cartridge 50 on mixer housing 24, the pinion shaft 37 along with coupling 63 and motor 34 are brought toward or away from the driven low speed gear 42. In this manner, the pinion gear 44 can be changed to a larger or smaller diameter gear and cartridge 50 can be rotated to a position in which the new pinion gear meshes operatively with low speed gear 42. Alternatively, cartridge 50 can be replaced with a cartridge fitted with a different diameter pinion gear.

The rotational position of the selected cartridge 50 can be fixed by one or more indexing pins 75, received in a bore in circular flange 72. For an embodiment in which the pinion gear diameter is changeable, flange 72 can have a series of locating holes, each placed at the proper rotational position on flange 72 to fix the cartridge at the position at which the pinion and low speed gear engage. Alternatively, a set of cartridges can be provided, each having one or more bores for indexing pin 75, angularly positioned on flange 72 for a given diameter of pinion gear. As a further alternative, the unit can be supplied with a single reduction cartridge and a multiple reduction cartridge, with respective indexing pin bores for each.

Rotation of cartridge 50 to adjust the spacing between the pinion shaft axis and the impeller shaft axis can apply for changing this spacing when changing the diameter of either or both of the pinion gear 44 and driven gear 42. However, it is convenient simply to change the pinion gear to a new diameter gear, similarly having teeth dimensioned to engage the driven gear 42, than it is to replace the driven gear. The self contained cartridge 50 makes it readily possible to configure a drive for a selected reduction ratio using a standardized housing and low speed gear, or to change reduction ratios later, for example in the field.

FIG. 4 shows that by placing the pinion axis slightly eccentrically on cartridge 50, a range of pinion diameters are possible which properly mesh the input pinion gear with low speed gear 42. In a preferred arrangement having a driven low speed gear 42 with 292 teeth and a diameter of approximately 18 inches (46 cm), ratios from approximately 20:1 to 5:1 are possible in a single reduction drive.

In addition to circular flange 72 at which cartridge 50 is clamped to housing 24 by clamping ring 73, the cartridge comprises a motor mounting 74, an intermediate flange 76 carrying an upper bearing supporting input shaft 37 and an end flange 78 with a bearing supporting input shaft 37 opposite from the pinion gear. This arrangement durably supports input pinion shaft 37 while avoiding a fixed rotational fitting in the bottom part of housing 24, and enables the entire cartridge, shaft and pinion assembly to be lifted from housing 24 as a unit. In the embodiment of FIGS. 1 and 3, the eccentric input pinion shaft 37 is essentially pivotable around the center of circular flange 72 for moving the pinion shaft axis relative to the impeller shaft axis.

Figure 5:
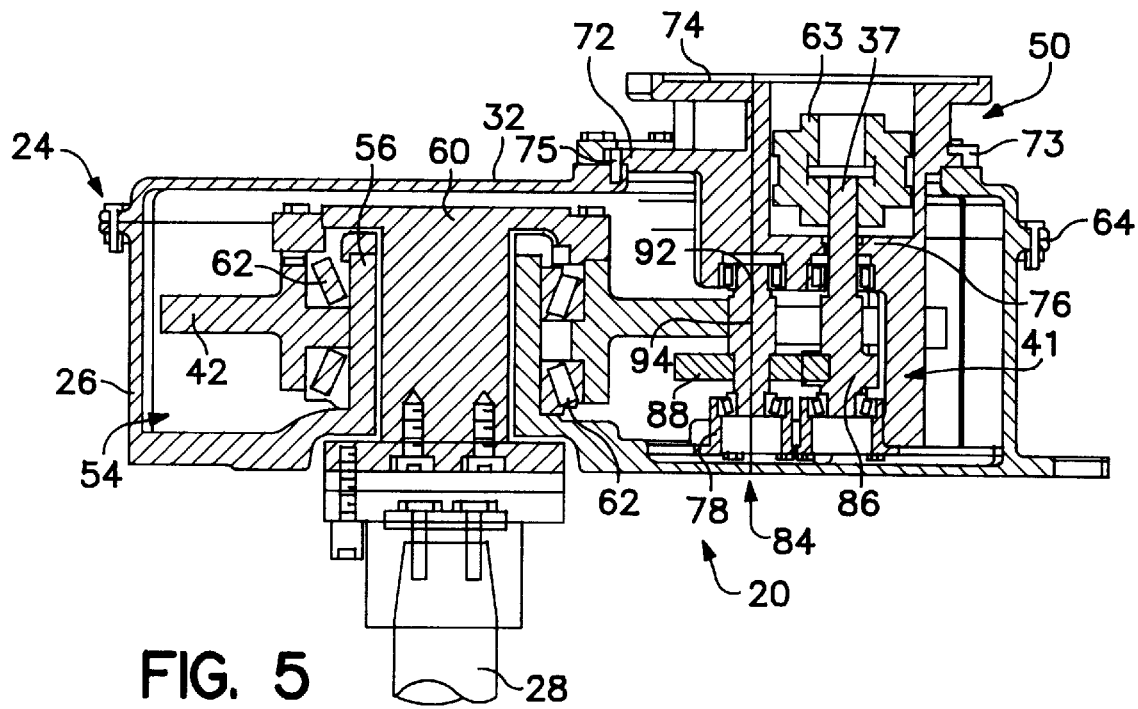
FIG. 5 is a section view corresponding to FIG. 3 but showing a double reduction embodiment.
Figure 6:
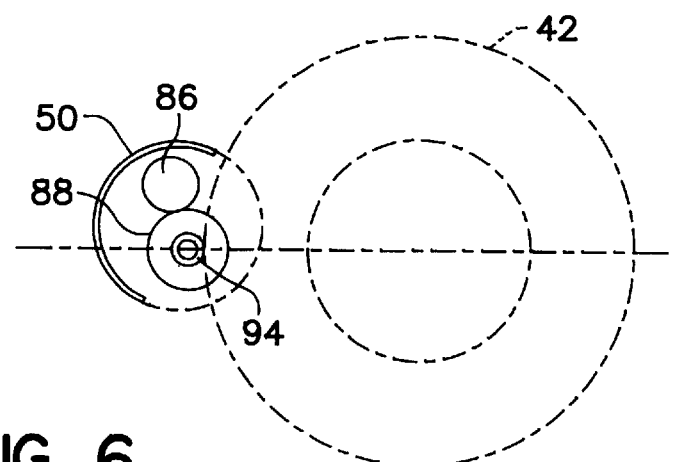
FIG. 6 is a schematic plan view showing a range of reduction ratios according to the embodiment of FIG. 5.

FIGS. 1 and 3 show a single reduction gear mixer. The invention is also applicable to embodiments having at least one additional reduction stage. Such an embodiment is shown in FIGS. 5 and 6, comprising a double reduction arrangement. In this arrangement, the motor (not shown) is coupled to a first input pinion shaft 37 carrying a small pinion 86. This small pinion 86 meshes with a larger gear 88 on an intermediary shaft 92 that in turn has a smaller usually-integral pinion 94 meshing with the driven low speed gear 42. This double reduction mechanism is useful for driving an impeller at low speed and high torque, whereas the single reduction mechanism achieves higher speed and lower torque.

The pinions of first and intermediate shaft are likewise immersed in the lubricant reservoir, in this case adjacent or below low speed gear 42. As a result of this compact arrangement, the larger intermediate gear 88 extends below low speed gear 42. It would not be possible to lift cartridge 50 vertically in the position shown in FIG. 5. However, cartridge 50 is rotatable when its clamping ring 73 and indexing pin 75 are removed. Rotating cartridge 50 to disengage smaller intermediate pinion 94 from low speed gear 42 also moves larger intermediate gear 88 outwardly from under the low speed gear. After rotating cartridge 50 sufficiently that pinion 88 clears gear 42, there is clearance available to lift cartridge 50 vertically from housing 24.

In FIG. 5, input shaft 37 and intermediary shaft 92 are both rotatably fixed in cartridge 50. It would also be possible to employ an adjustable mounting between an input pinion and a fixed intermediary pinion in a drive arrangement having plural reduction stages.

In the rotatably eccentric cartridge mounting as shown, a given size for pinion gear 94 dictates a particular rotation angle of cartridge 50 to cause the gears 94, 42 to mesh. By appropriately pairing pinion gears of predetermined diameters with circular cartridge flanges having bolt hole positions and index pins that are complementary with the respective pinion sizes, a set of cartridges can be provided to accommodate a range of gear reduction ratios. In the above configuration, for example, seven different pinion gear diameters, each having gear teeth dimensioned to mesh with the same low speed gear 42, can be supplied to encompass the range of reductions in incremental steps. Of course more or fewer increments would also be possible.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

We claim:

1. A gear reduction apparatus, comprising:
   a housing;
   a pinion shaft having a pinion gear rotatably driven by a motor;
   a driven shaft mounted rotatably in the housing, coupled to a driven gear meshing with the pinion gear;
   a cartridge supporting the pinion shaft, the cartridge being adjustably mounted to the housing for moving the pinion shaft toward and away from the driven gears;
   at least one reduction gear coupled between the motor and the pinion shaft carrying the pinion gear that engages the driven gear, and wherein the at least one reduction gear between the motor and the pinion shaft is disposed below the driven gear and wherein the cartridge is rotatable sufficiently that said at least one reduction gear clears the driven gear after the pinion gear disengages from the driven gear.

2. The apparatus of claim 1, wherein the cartridge is rotatably mounted on the housing and the pinion shaft is eccentric to a rotational axis of the cartridge such that rotation of the cartridge moves the pinion shaft toward and away from the driven gear.

3. The apparatus of claim 2, wherein the cartridge is mounted on the housing via a circular flange and the pinion shaft is eccentric to the circular flange.

4. The apparatus of claim 2, wherein the housing comprises a bottom part forming a lubricant reservoir and a top cover, the cartridge being mounted in the top cover and the pinion gear, driven gear and supporting bearings therefor being immersed in the reservoir.

5. The apparatus of claim 2, further comprising rotational fittings attached to the cartridge and supporting the pinion shaft, and wherein the pinion shaft is supported exclusively by the cartridge.

6. The apparatus of claim 4, wherein the bottom part of the housing comprises a supporting drywell tubular part defining a wall of the lubricant reservoir, wherein the driven shaft is rotatable within the tubular part on a vertical axis and the driven gear is rotatable around the tubular part inside the housing.

7. The apparatus of claim 6, wherein the driven shaft is an impeller shaft and the apparatus comprises a gear reducer for a mixer.

8. The apparatus of claim 1, wherein the motor is mounted on and pivotable with the cartridge.

9. The apparatus of claim 1, wherein the cartridge is rotatable to accommodate a range of diameters of the pinion gear.

10. The apparatus of claim 1, wherein the cartridge is fixable to the housing at discrete rotation angles.

11. The apparatus of claim 1, wherein the cartridge is fixable to the housing at least at one predetermined rotation angle by an indexing pin extending through parts of the cartridge and the housing.

12. A mixing apparatus, comprising:
    a housing;
    a pinion shaft having a pinion gear rotatably driven by a motor;
    a driven impeller shaft mounted rotatably in the housing, coupled to a driven gear meshing with the pinion gear;
    a cartridge supporting the pinion shaft, the cartridge being adjustably mounted to the housing for moving the pinion shaft toward and away from the driven gear;
    wherein the cartridge is rotatable mounted on the housing and the pinion shaft is eccentric to a rotational axis of the cartridge such that rotation of the cartridge moves the pinion shaft toward and away from the driven gear;
    at least one reduction gear coupled between the motor and the pinion shaft carrying the pinion gear that engages the driven gear; and,
    wherein the at least one reduction gear between the motor and the pinion shaft is disposed below the driven gear and wherein the cartridge is rotatable sufficiently that said at least one reduction gear clears the driven gear after the pinion gear disengages from the driven gear.

13. The mixing apparatus of claim 12, wherein the cartridge is mounted on the housing via a circular flange and the pinion shaft is eccentric to the circular flange, and further comprising a locating structure engaging between the flange and the housing operable to fix the circular flange at least at one predetermined angular orientation at which said pinion gear, having a predetermined diameter, engages the driven gear.

14. The mixing apparatus of claim 12, further comprising rotational fittings attached to the cartridge and supporting the pinion shaft, and wherein the pinion shaft is supported exclusively by the cartridge.

15. The mixing apparatus of claim 12, further comprising at least one reduction gear coupled between the motor and the pinion shaft carrying the pinion gear that engages the driven gear.

\* \* \* \* \*